USOO8185699B2

(12) United States Patent
Endo et al.

(10) Patent No.: US 8,185,699 B2
(45) Date of Patent: May 22, 2012

(54) CACHE MEMORY CONTROLLER AND CACHE MEMORY CONTROLLING METHOD

(75) Inventors: Kumiko Endo, Kawasaki (JP); Hitoshi Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 928 days.

(21) Appl. No.: 12/222,231

(22) Filed: Aug. 5, 2008

(65) Prior Publication Data

US 2008/0313409 A1    Dec. 18, 2008

Related U.S. Application Data

(63) Continuation of application No. PCT/JP2006/303476, filed on Feb. 24, 2006.

(51) Int. Cl.
*G06F 12/00* (2006.01)
*G06F 13/00* (2006.01)
(52) U.S. Cl. ........ 711/141; 711/100; 711/117; 711/143; 711/151
(58) Field of Classification Search .................. 711/100, 711/117, 118, 143, 151, 158, 141, 154
See application file for complete search history.

(56) References Cited

U.S. PATENT DOCUMENTS

| 5,347,648 | A | * | 9/1994 | Stamm et al. ................. 714/5.11 |
| 5,355,467 | A | * | 10/1994 | MacWilliams et al. ........ 711/146 |
| 5,634,068 | A | * | 5/1997 | Nishtala et al. ................ 711/141 |
| 5,644,753 | A | * | 7/1997 | Ebrahim et al. ............... 711/131 |
| 5,812,757 | A | | 9/1998 | Okamoto et al. |

FOREIGN PATENT DOCUMENTS

| JP | 2-181844 | 7/1990 |
| JP | 07-175765 | 7/1995 |

OTHER PUBLICATIONS

Japanese Notice of Rejection for corresponding Japanese Office Action 2008-501552; issued May 10, 2010.
International Search Report mailed on May 23, 2006 in connection with International Application No. PCT/JP2006/303476.

* cited by examiner

*Primary Examiner* — Tuan V. Thai
(74) *Attorney, Agent, or Firm* — Fujitsu Patent Center

(57) ABSTRACT

In a separating device that separates a processor configured to perform process by using data recorded in a cache memory connected to the processor, a stopping unit, upon receiving a processor separation request, stops the processor from performing a new process; and a separation executing unit, upon completion of process being performed by the processor, separates the processor after invalidating the data recorded in the cache memory.

4 Claims, 6 Drawing Sheets

CACHE MEMORY CONTROLLER AND CACHE MEMORY CONTROLLING METHOD

This application is a continuing application, filed under 35 U.S.C. §111(a), of International Application PCT/JP2006/303476, filed Feb. 24, 2006, the disclosure of which is incorporated herein by reference.

BACKGROUND OF THE INVENTION

1. Field of the Invention

The present invention relates to a technology for separating a processor that performs process by using data recorded in a cache memory.

2. Description of the Related Art

Typically, a cache memory has been used to solve a problem of data delay occurring between a processor and a main memory. A cache-memory managing device that manages the cache memory maintains coherence between the main memory and the cache memory according to write back algorithm, for example.

In separating the processor by reconfiguring a system including the processor, the cache-memory managing device requests the processor for a separation. Upon receiving a response from the processor, the cache-memory managing device invalidates the cache memory and separates the processor.

According to the write back algorithm, because of its characteristics, when the processor updates the data of the cache memory, the updated data is not simultaneously written back into the main memory. Therefore, in invalidating the cache memory for separating the processor, the cache-memory managing device determines whether the write back of the data accessed by the processor is necessary. When the write back is necessary, the cache-memory managing device writes back the data, and maintains coherence between the main memory and the cache memory.

In recent years, following the improvement of processor performance and the increase in the memory capacity of the cache memory, the cache memory is, in some cases, shared by a plurality of processors. In a system with a plurality of processors mounted thereon, there are many cases where an arbitrary processor needs to be dynamically separated to reconfigure the system. However, according to the conventional technology, a processor separation process becomes complex, and the processor cannot be separated quickly.

That is, even in the system in which a plurality of processors shares a cache memory, it is quite important to separate a processor safely and promptly from the system, thereby increasing system availability.

SUMMARY

It is an object of the present invention to at least partially solve the problems in the conventional technology.

According to an aspect of the present invention, there is provided a separating device that separates a processor configured to perform process by using data recorded in a cache memory connected to the processor, the separating device including a stopping unit that, upon receiving a processor separation request, stops the processor from performing a new process; and a separation executing unit that, upon completion of process being performed by the processor, separates the processor after invalidating the data recorded in the cache memory.

According to another aspect of the present invention, there is provided a separating method for separating a processor configured to perform process by using data recorded in a cache memory connected to the processor, the method including stopping, upon receiving a processor separation request, the processor from performing a new process; and separating, upon completion of process being performed by the processor, the processor after invalidating the data recorded in the cache memory.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained in detail below with reference to the accompanying drawings. The present invention is not limited to the embodiments.

Figure 5:
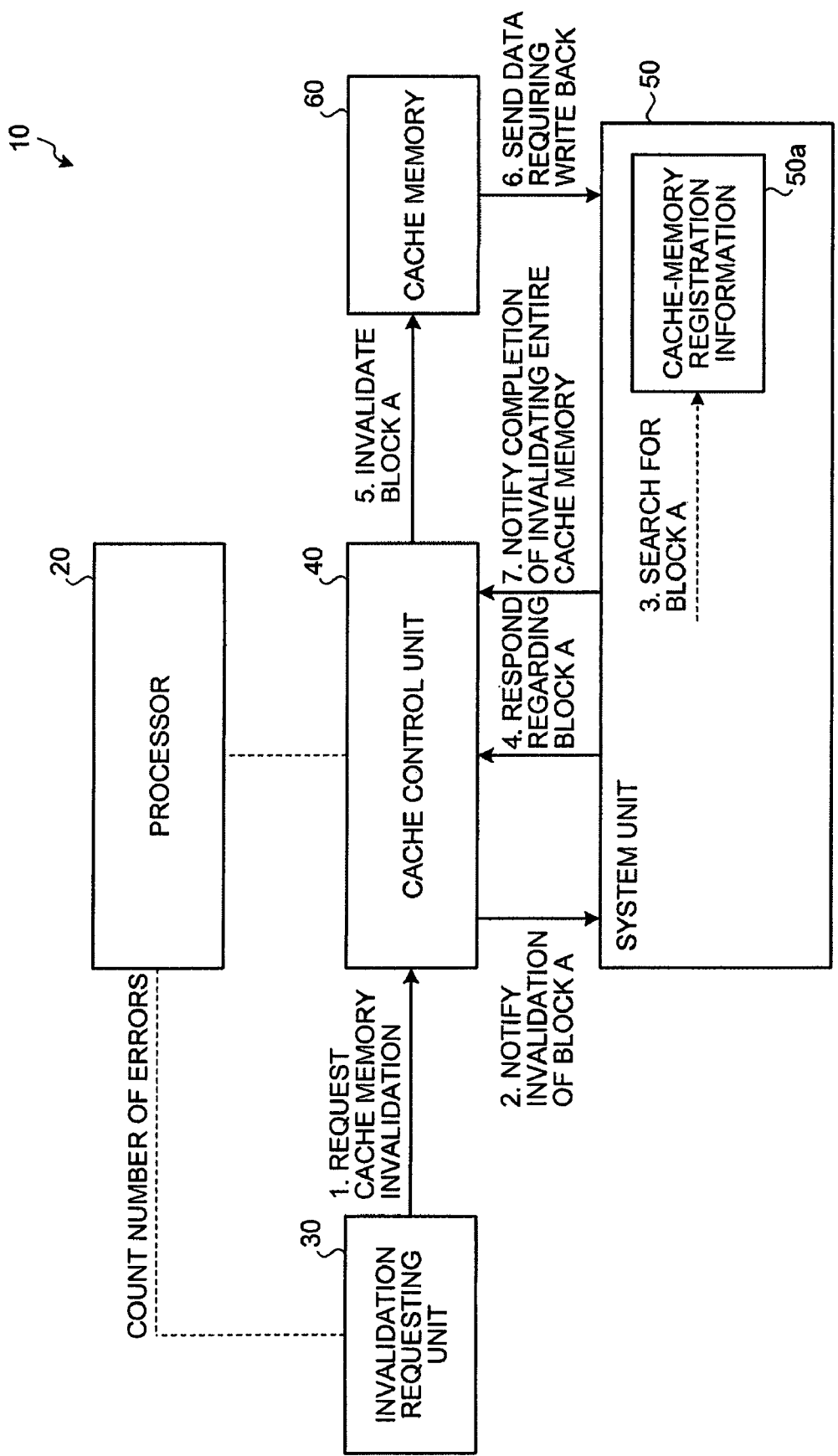
FIG. 5 is a schematic diagram for explaining an invalidation process according to a conventional technology.
Figure 6:
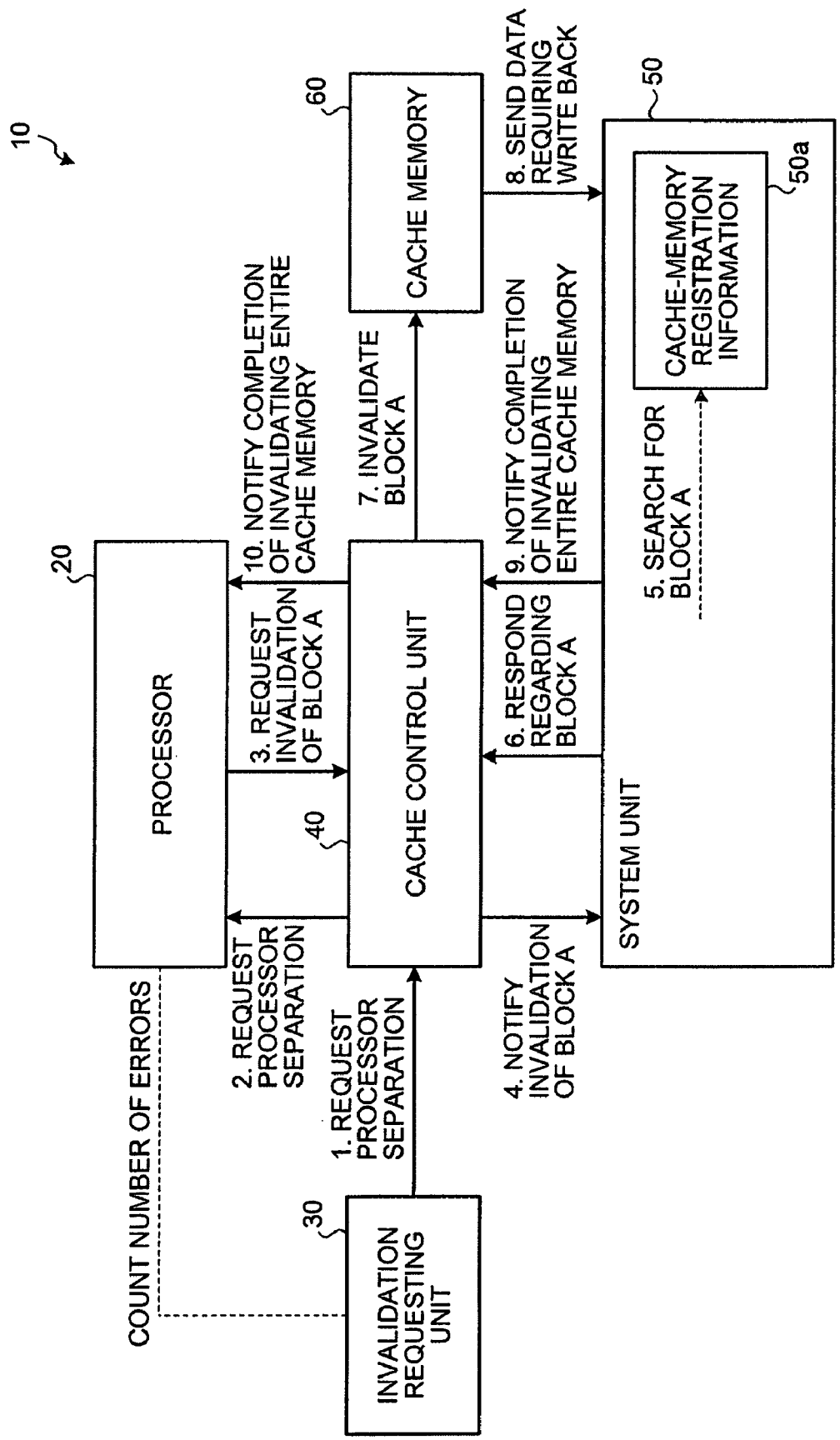
FIG. 6 is a schematic diagram for explaining a processor separation process according to the conventional technology.

FIG. 5 is a schematic diagram for explaining an invalidation process according to a conventional technology, and FIG. 6 is a schematic diagram for explaining a separation of a processor according to the conventional technology.

A processor unit 10 shown in FIG. 5 includes a processor 20, an invalidation requesting unit 30, a cache control unit 40, a system unit 50, and a cache memory 60. The processor 20 accesses data stored in the cache memory 60, performs a predetermined operation, and stores data resulting from the operation into the cache memory 60. The cache memory 60 stores instructions used by the processor 20 and data to be processed by the processor 20.

The invalidation requesting unit 30 outputs a request for invalidating the cache memory 60 (hereinafter, "cache-memory invalidation request") to the cache control unit 40. When the invalidation requesting unit 30 receives a request for separating the processor 20 from a user via an input device or receives a request for separating the processor 20 from a dynamic reconfiguration program, the invalidation requesting unit 30 outputs a request for separating the processor 20 (hereinafter, "processor separation request") to the cache control unit 40.

Furthermore, the invalidation requesting unit 30 counts the number of errors occurring in the processor 20 and outputs a processor separation request to the cache control unit 40 when the number of errors is equal to or larger than a predetermined value.

When a cache-memory invalidation request or a processor separation request is received from the invalidation requesting unit 30, the cache control unit 40 controls the invalidation of data stored in the cache memory 60. The cache control unit 40 maintains coherence between a main memory (not shown) and the cache memory 60 by the write back algorithm.

The system unit 50 determines whether data to be invalidated in the cache memory 60 is to be written back to the main memory. The system unit 50 stores cache-memory registration information 50a indicating a registration state of data stored in the cache memory 60 and determines whether the data write back is necessary based on the cache-memory registration information 50a.

The invalidation process according to the conventional technology is explained with reference to FIG. 5. The invalidation requesting unit 30 outputs a cache invalidation request to the cache control unit 40. Upon receiving the cache invalidation request, the cache control unit 40 outputs information on the invalidation of, for example, a block A to the system unit 50. The system unit 50 searches the cache-memory registration information 50a to determine whether the data stored in the block A is to be written back, and outputs a response regarding the block A containing a result of the determination to the cache control unit 40.

The cache control unit 40 receives a response regarding the block A from the system unit 50 and invalidates the data of the block A stored in the cache memory 60. When the data write back is necessary, the cache control unit 40 writes back the data recorded in the block A to the main memory and then invalidates the block A. After the invalidation of all blocks in the cache memory 60 is completed, the system unit 50 notifies the cache control unit 40 that the invalidation of all the blocks in the cache memory 60 is completed.

The process of separating the processor according to the conventional technology is explained next with reference to FIG. 6. The invalidation requesting unit 30 outputs a processor separation request to the cache control unit 40. Upon receiving the processor separation request, the cache control unit 40 outputs the processor separation request to the processor 20.

The processor 20 receives the processor separation request and outputs a request for invalidating, for example, the block A to the cache control unit 40. The cache control unit 40 outputs information on invalidating the block A to the system unit 50. The system unit 50 searches the cache memory registration information 50a to determine whether the data stored in the block A is to be written back and outputs a response regarding the block A containing a result of the determination to the cache control unit 40.

The cache control unit 40 receives the response about the block A from the system unit 50 and invalidates the data of the block A stored in the cache memory 60. When the data write back is necessary, the cache control unit 40 writes back the data recorded in the block A to the main memory and then invalidates the block A. After the invalidation of all blocks in the cache memory 60 is completed, the system unit 50 outputs to the cache control unit 40 that the invalidation of all the blocks in the cache memory 60 is completed. The cache control unit 40 notifies the processor 20 that the invalidation of all the blocks in the cache memory 60 is completed, and separates the processor 20.

However, as shown in FIG. 6, in separating the processor 20, the separation process needs to involve the processor 20, and thus the processor 20 cannot be separated promptly. When the cache memory is shared by a plurality of processors, the cache memory needs to be invalidated by additionally considering the shared state of the cache memory by the processors, which poses a more serious problem.

Figure 1:
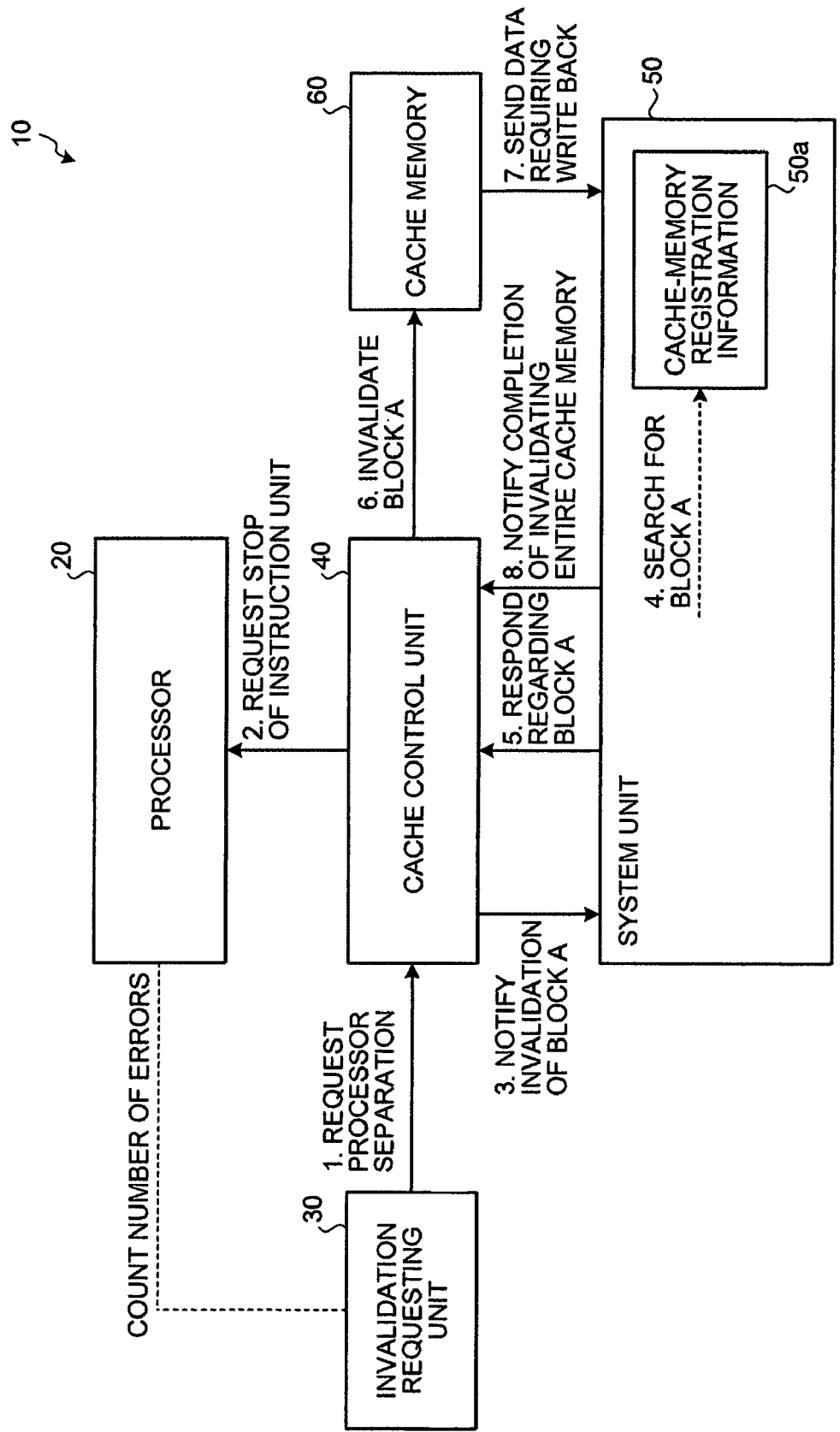
FIG. 1 is a schematic diagram for explaining a processor separation process according to an embodiment of the present invention.

Therefore, in the present embodiment, when the processor separation request is received, the operation of the processor to be separated is stopped (that is, an instruction unit is stopped), and the cache memory is invalidated, so that the above problems of the conventional technology are solved. FIG. 1 is a schematic diagram for explaining a processor separation process. For convenience sake, the process is explained using the constituent elements shown in FIG. 5 and FIG. 6.

As shown in FIG. 1, the invalidation requesting unit 30 outputs a processor separation request to the cache control unit 40. The cache control unit 40 then outputs an instruction-unit stop request to the processor 20. Upon receiving the instruction-unit stop request, the instruction unit of the processor 20 stops execution of a new instruction and completes an instruction currently being executed.

The cache control unit 40 outputs information on invalidation of the block A to the system unit 50. The system unit 50 searches the cache-memory registration information 50a to determine whether the data stored in the block A is to be written back and outputs a response regarding the block A containing a result of the determination to the cache control unit 40.

The cache control unit 40 obtains the response regarding the block A from the system unit 50 and invalidates the data of the block A stored in the cache memory 60. When the data write back is necessary, the cache control unit 40 writes back the data recorded in the block A to the main memory and then invalidates the block A. After the invalidation of all blocks in the cache memory 60 is completed, the system unit 50 notifies the cache control unit 40 that the invalidation of all the blocks in the cache memory 60 is completed.

As explained above, according to the embodiment, the invalidation process of the cache memory 60 is performed without involving the processor 20, and the processor 20 is separated. Therefore, the processor 20 can be separated promptly. Moreover, because the cache memory 60 is invalidated or written back after stopping a new operation of the processor 20, a new data request or a data rewrite request to the main memory does not occur. Consequently, occurrence of a difference between the content of the cache memory and the content of the main memory can be prevented.

Figure 2:
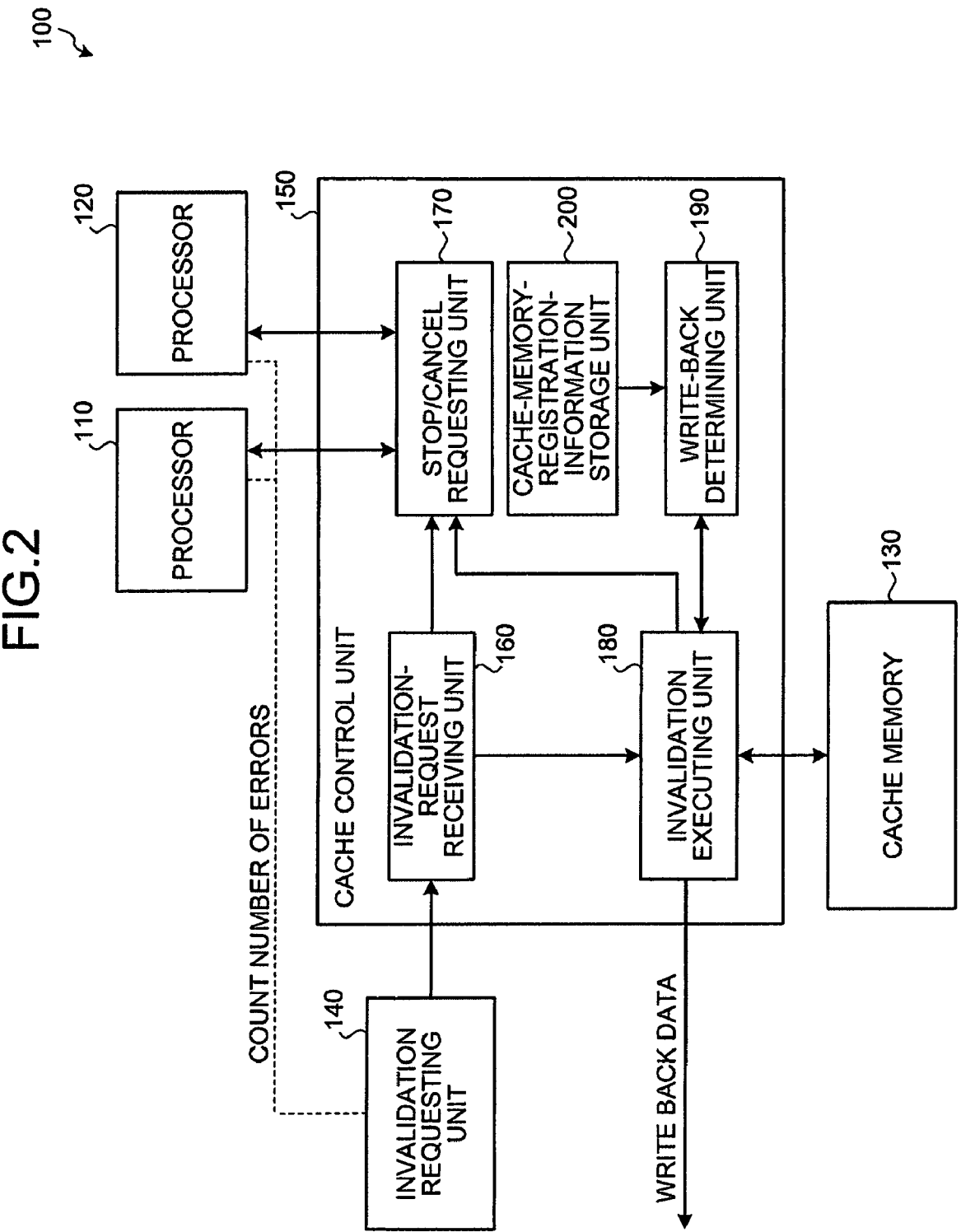
FIG. 2 is a functional block diagram of a configuration of a processor unit according to the embodiment of the present invention.

A configuration of a processor unit according to the present embodiment is explained next. FIG. 2 is a functional block diagram of a configuration of the processor unit 100 according to the present embodiment. As shown in FIG. 2, the processor unit 100 includes processors 110 and 120, a cache memory 130, an invalidation requesting unit 140, and a cache control unit 150.

The processors 110 and 120 access data stored in the cache memory 130, perform predetermined operations, and store data on results of the operations into the cache memory 130. While only the processors 110 and 120 are shown for the sake of explanation, the processors are not limited to these. The cache memory 130 stores instructions used and data to be processed by the processors 110 and 120.

The invalidation requesting unit 140 outputs a cache-memory invalidation request to the cache control unit 150. Upon receiving a request for separating the processor 110 or 120 from the user via the input device or a request for separating the processor 110 or 120 from a dynamic reconfiguration program, the invalidation requesting unit 140 outputs a processor separation request to the cache control unit 150.

This processor separation request includes any one of the request for separating the processor 110, and the request for separating the processor 120, and the request for separating both of the processors 110 and 120.

The invalidation requesting unit 140 counts the number of errors occurring in the processors 110 and 120. When the number of errors occurred in a processor becomes equal to or larger than a predetermined value, the invalidation requesting unit 140 outputs to the cache control unit 150, a processor separation request for separating the processor.

The cache control unit 150 controls the invalidation of data stored in the cache memory 130 when a cache-memory invalidation request or a processor separation request is received from the invalidation requesting unit 140. The cache control unit 150 maintains coherence between the main memory and the cache memory 130 by the write back algorithm.

The cache control unit 150 includes an invalidation-request receiving unit 160, a stop/cancel requesting unit 170, an invalidation executing unit 180, a write-back determining unit 190, and a cache-memory-registration-information storage unit 200.

The invalidation-request receiving unit 160 receives either a cache-memory invalidation request or a processor separation request from the invalidation requesting unit 140. Upon receiving the cache-memory invalidation request from the invalidation requesting unit 140, the invalidation-request receiving unit 160 requests the invalidation executing unit 180 to invalidate the cache memory 130.

On the other hand, upon receiving the processor separation request from the invalidation requesting unit 140, the invalidation-request receiving unit 160 outputs the received processor separation request to the stop/cancel requesting unit 170, and requests the invalidation executing unit 180 to invalidate the cache memory 130.

The stop/cancel requesting unit 170 separates the processor 110 or 120. Specifically, upon receiving the processor separation request from the invalidation-request receiving unit 160, the stop/cancel requesting unit 170 outputs an instruction-unit stop request to the processors 110 and 120, thereby stopping the processors 110 and 120 executing a new instruction, and making the processors 110 and 120 complete the instruction currently being executed.

Upon receiving from the invalidation executing unit 180 information on completion of the invalidation of the cache memory 130, the stop/cancel requesting unit 170 changes the state of the processor to be separated, from valid to invalid, and cancels the stop state of the processor not to be separated, thereby permitting execution of a new instruction.

For example, in the case where the processor separation request is a request for separating the processor 110, when the stop/cancel requesting unit 170 receives from the invalidation executing unit 180 the information on completion of the invalidation of the cache memory 130, the stop/cancel requesting unit 170 changes the state of the processor 110 from valid to invalid and cancels the stop state of the processor 120 to permit the execution of a new instruction.

In the case where the processor separation request is a request for separating the processor 120, when the stop/cancel requesting unit 170 receives from the invalidation executing unit 180 the information on completion of the invalidation of the cache memory 130, the stop/cancel requesting unit 170 changes the state of the processor 120 from valid to invalid and cancels the stop state of the processor 110 to permit the execution of a new instruction.

In the case where the processor separation request is a request for separating both the processors 110 and 120, when the stop/cancel requesting unit 170 receives from the invalidation executing unit 180 the information on completion of the invalidation of the cache memory 130, the stop/cancel requesting unit 170 changes the states of the processors 110 and 120 from valid to invalid.

The invalidation executing unit 180, upon receiving the invalidation request from the invalidation-request receiving unit 160, invalidates each block of the cache memory 130, and outputs information on completion of the invalidation to the stop/cancel requesting unit 170, when the invalidation of the cache memory 130 is all completed.

In invalidating the data recorded in the block of the cache memory 130, the invalidation executing unit 180 outputs identification information of a block to be invalidated (hereinafter, "block identification information") to the write-back determining unit 190, and receives a response from the write-back determining unit 190. When the write back is necessary, the invalidation executing unit 180 writes back the data stored in the block to be invalidated, to the main memory, and then invalidates the data. When the write back is not necessary, the invalidation executing unit 180 directly invalidates the data stored in the block to be invalidated.

The write-back determining unit 190, upon receiving the block identification information from the invalidation executing unit 180, searches the cache-memory-registration-information storage unit 200 for the registration state of the block corresponding to the block identification information, and determines whether the write back of the data stored in the block is necessary. The cache-memory-registration-information storage unit 200 stores registration information on data (for example, information on whether the data is updated after performing the write back) stored in each block of the cache memory 130.

When the write back is determined to be necessary, the write-back determining unit 190 outputs information that the write back is necessary, to the invalidation executing unit 180. When the write back is determined to be not necessary, the write-back determining unit 190 outputs information that the write back is not necessary, to the invalidation executing unit 180.

Figure 3:
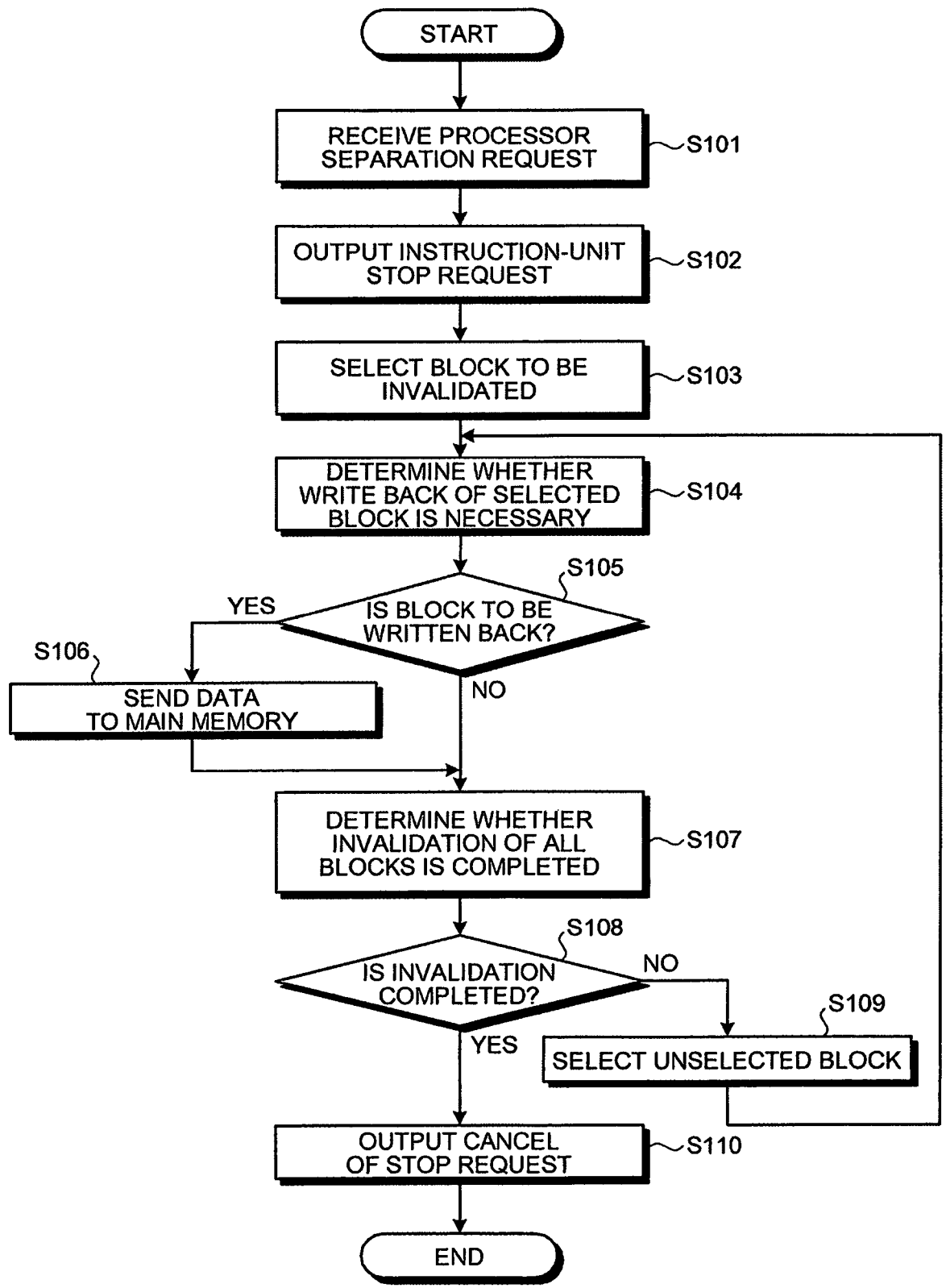
FIG. 3 is a flowchart of a separation process performed by the processor unit according to the embodiment.

The separation process performed by the processor unit 100 is explained next. FIG. 3 is a flowchart of the separation process performed by the processor unit 100. As shown in FIG. 3, in the processor unit 100, the invalidation-request receiving unit 160 receives a processor separation request from the invalidation requesting unit 140 (Step S101), and the stop/cancel requesting unit 170 receives the processor separation request from the invalidation-request receiving unit 160 and outputs the instruction-unit stop request to the processors 110 and 120 (Step S102).

Next, the invalidation executing unit 180 receives the invalidation request from the invalidation-request receiving unit 160 and selects a block to be invalidated (Step S103). The write-back determining unit 190 receives block identification information from the invalidation executing unit 180, and determines whether the write back of the block selected by the invalidation executing unit 180 is necessary by searching the cache-memory-registration-information storage unit 200 (Step S104).

When the write-back determining unit 190 determines that the write back is necessary (YES at Step S105), the invalidation executing unit 180 sends data stored in the block to be invalidated, to the main memory and determines whether the invalidation of all blocks is completed (Step S107). On the other hand, when the write-back determining unit 190 determines that the write back is not necessary (NO at Step S105), the system control directly proceeds to Step S107.

Upon determining that the invalidation of all blocks is not completed (NO at Step S108), the invalidation executing unit 180 selects an unselected block (Step S109), and the system control returns to Step S104.

On the other hand, when the invalidation executing unit 180 determines that the invalidation of all blocks is completed (YES at Step S108), the stop/cancel requesting unit 170 receives information from the invalidation executing unit 180 that the invalidation of all blocks is completed and cancels the stop request of the processor not to be separated (Step S110).

As described above, in the processor unit 100, when a processor separation request is received, the cache control unit 150 outputs a stop request of an instruction unit to the processors 110 and 120. After the invalidation of the cache memory 130 is completed, the stop request to the processor other than the processor to be separated is canceled. Therefore, the processor separation process can be performed efficiently.

As described above, in separating either both or one of the processors 110 and 120 in the processor unit 100, the invalidation requesting unit 140 outputs a processor separation request to the cache control unit 150, and the cache control unit 150 then outputs an instruction-unit stop request to the processors 110 and 120. After the processors 110 and 120 complete the processes being performed, the cache control unit 150 invalidates each block in the cache memory 130, cancels the stop request to the processor other than the processor to be separated, and does not cancel the stop request to the processor to be separated, thereby separating the processor. Therefore, even when the cache memory 130 is shared by the processors 110 and 120, the processor can be separated from the system safely and promptly, thereby increasing system availability.

When one processor uses the cache memory, the processor can be separated by stopping the instruction unit of the processor and invalidating all data recorded in the cache memory. Therefore, the processor can be separated promptly without performing a complex process.

Figure 4:
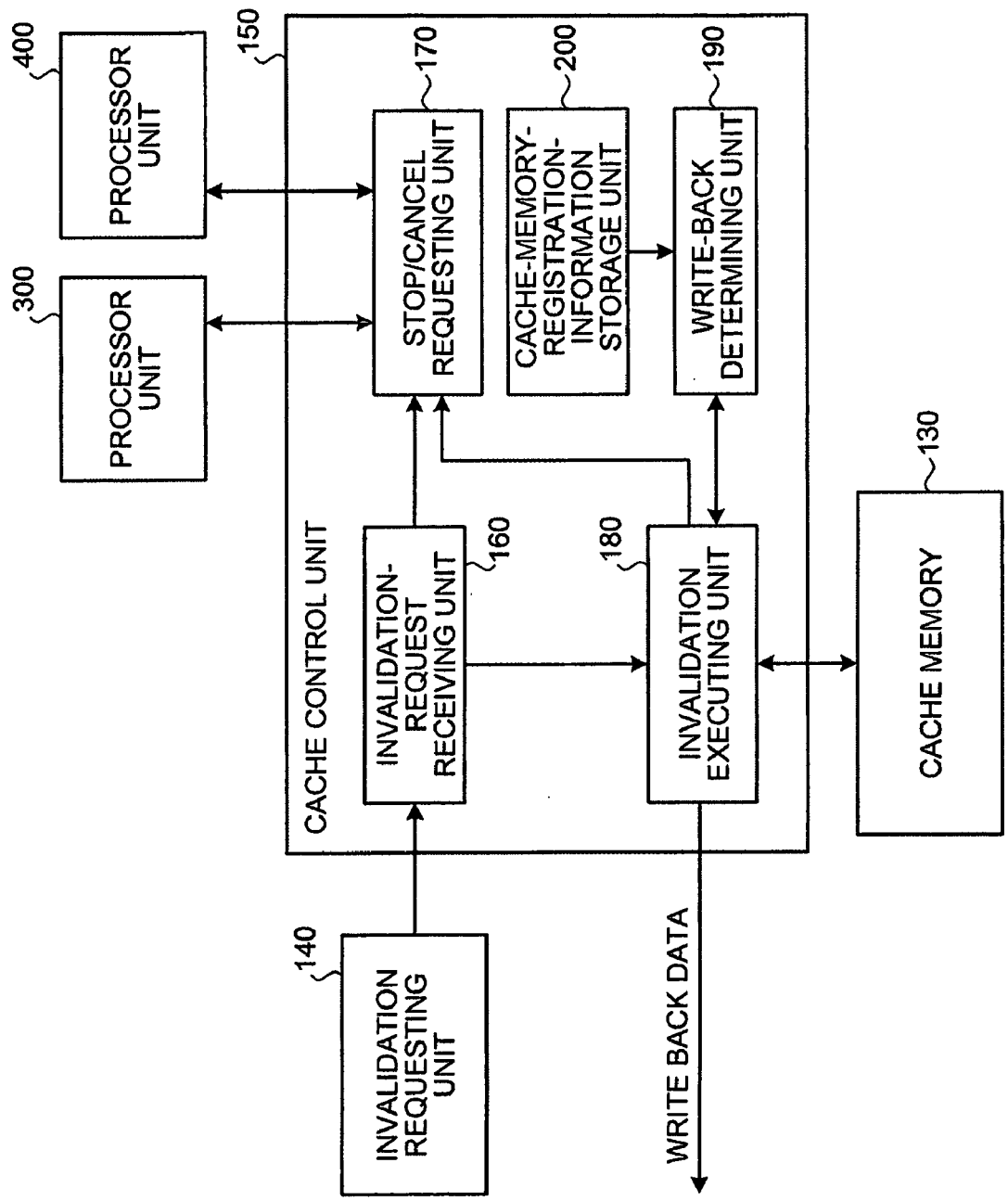
FIG. 4 is a schematic diagram of an example of a configuration in which a cache memory is shared by processors provided in different processor units.

In the present embodiment, separation of processors provided in the same processor unit is explained. When the cache memory is shared by processors provided in different processor units, the processors can be also separated using a similar method. FIG. 4 is a schematic diagram of one example of a configuration in which a cache memory is shared by processors provided in different processor units.

As shown in FIG. 4, in separating processors provided in processor units 300 and 400, the cache control unit 150 outputs an instruction-unit stop request to the processors provided in the processor units 300 and 400. Upon completion of the invalidation of the cache memory 130, the cache control unit 150 cancels the stop request to processors other than the processor to be separated, thereby separating of the processor.

According to an aspect of the present invention, even when a plurality of processors share a cache memory, a processor can be separated safely and promptly from the system, thereby increasing system availability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A cache memory controller for separating any of a plurality of processors connected to a cache memory, the cache memory controller comprising:
    a stopping unit that stops the plurality of processors from performing a new process and causes the plurality of processors to complete ongoing processes when the stopping unit receives a processor separation request;
    an invalidation unit that issues the processor separation request and invalidates data stored in the cache memory when all of the plurality of processors complete the ongoing processes; and
    a separating unit that separates at least one of the plurality of processors while resuming an operation by the other processors of the plurality of processors.

2. The cache memory controller according to claim 1, wherein the invalidation unit writes back specific data that does not maintain coherency with data in a main memory to the main memory among the data stored in the cache memory and invalidates the data in the cache memory.

3. A cache memory controlling method for separating any of a plurality of processors connected to a cache memory, the cache memory controlling method comprising:
    stopping the plurality of processors from performing a new process;
    issuing a processor separation request;
    causing the plurality of processors to complete ongoing processes when receiving the issued processor separation request;
    invalidating data stored in the cache memory when all of the plurality of processors complete the ongoing processes; and
    separating at least one of the plurality of processors while resuming an operation by the other processors of the plurality of processors.

4. The cache memory controlling method according to claim 3, wherein the invalidating includes writing back specific data that does not maintain coherency with data in a main memory to the main memory among the data stored in the cache memory and invalidating the data in the cache memory.

* * * * *